Nov. 7, 1950  J. S. ADKINS  2,528,487
VERTICAL GYROSCOPE COMPENSATED FOR TURN ERRORS
Filed Dec. 31, 1947  2 Sheets-Sheet 1

INVENTOR.
JOHN S. ADKINS
BY Wade Koonty
ATTORNEY
Charles L. Burgoyne
AGENT

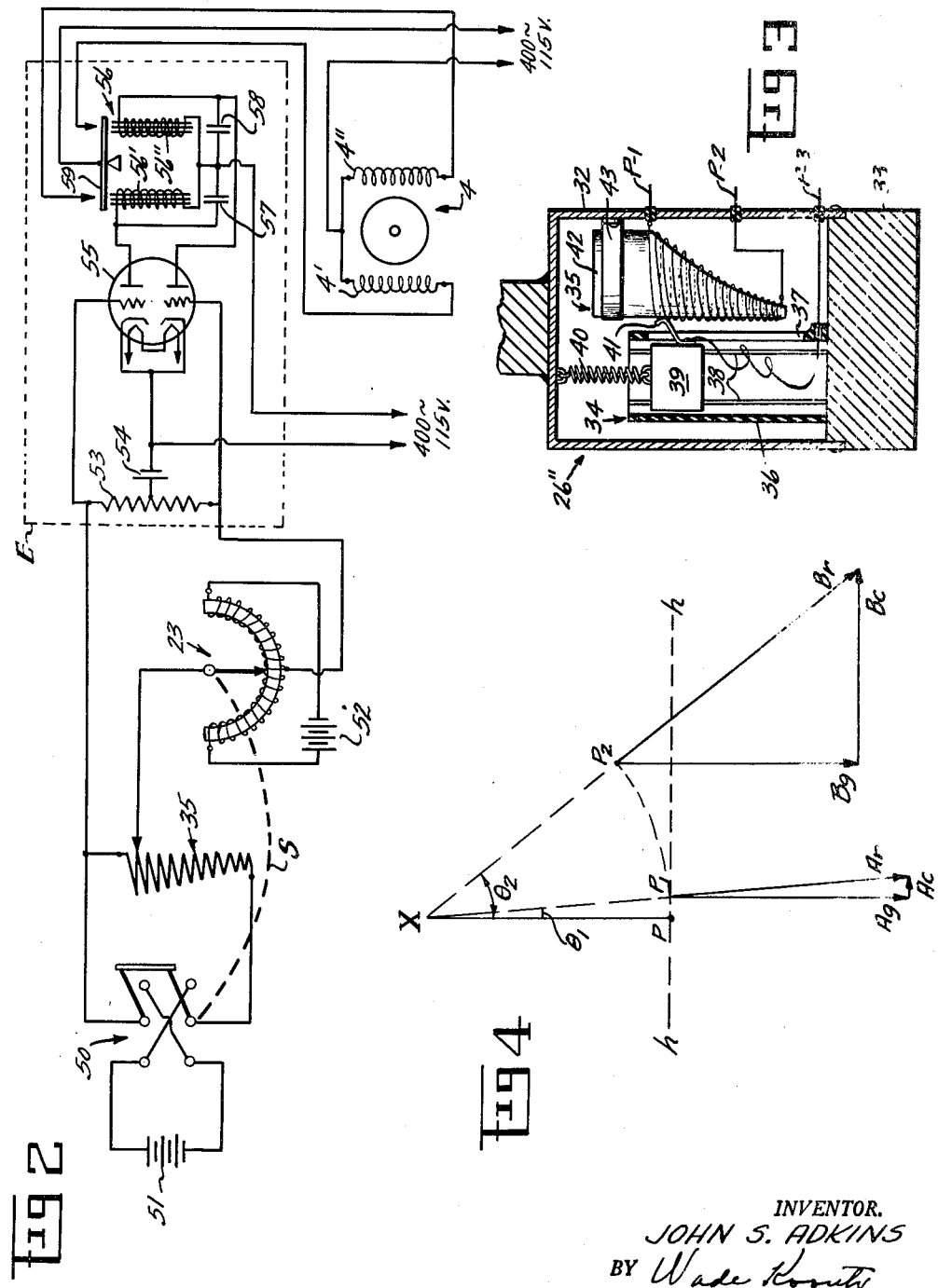

Patented Nov. 7, 1950

2,528,487

UNITED STATES PATENT OFFICE 2,528,487

VERTICAL GYROSCOPE COMPENSATED FOR TURN ERRORS

John Samuel Adkins, Dayton, Ohio

Application December 31, 1947, Serial No. 794,854

6 Claims. (Cl. 74—5.47)

(Granted under the act of March 3, 1883, as amended April 30, 1928; 370 O. G. 757)

The invention described herein may be manufactured by or for the United States Government for governmental purposes without payment to me of any royalty thereon.

This invention relates to gyroscopic artificial horizons, sometimes known as gyro-verticals, which are employed not only in visual indicators but also as reference means from which to control the lateral and longitudinal stability of aircraft and ships and of sighting equipment, radar equipment and gun mounts carried on aircraft and ships. Such gyroscopes are usually mounted in substantially neutral equilibrium or made slightly pendulous, and are maintained in their normal position by gravitationally controlled erecting devices, such as pendulums or liquid level devices, which govern the application of a source of power to a torque motor operating in a plane normal to the direction of tilt. More specifically the present invention relates to a vertical gyroscope provided with means to erect the bank gimbal in the direction of gravity vertical during a turn of the aircraft or ship.

The principal object of the invention is to provide pendulous means incorporated in the structure of a vertical gyroscope for erecting the gyroscope in the direction of gravity vertical during a turn of such scope as to develop appreciable acceleration forces.

In vertical gyroscopes whether used on gyro-horizons, gyro-stabilizers or automatic pilots the main cause of error is due to the fact that during turns the gyroscope is ordinarily erected in the direction of the resultant acceleration force, thus giving rise to what is known as turn error. While the erection system may be automatically cut off during a turn, this leaves the gyroscope to control itself by the principle of gyro-stability during the turn. However this is not a desirable alternative, since the acceleration forces developed in the turn as well as normal friction of the suspension may throw the gyroscope off appreciably during a turn of some extent. The turn error as referred to above comes about because of the use of a bank pendulum device to actuate the erecting means and because such a pendulum always assumes a position or angular displacement corresponding to the direction of the resultant acceleration force acting thereon. This direction may or may not be in the direction of true gravity vertical, but in a turn will not correspond to the true vertical because of the centrifugal forces acting on the pendulum. In further explanation a bank pendulum might be defined as a compound or physical pendulum swinging in a plane normal to the fore and aft axis of the aircraft or ship to detect by means of a pick-off device the direction of the resultant acceleration force acting on the pendulum. Thus it is an object of the present invention to provide in a vertical gyroscope as described above a means to detect the extent of deviation of the bank pendulum from the gravity vertical and develop a corresponding counter signal capable of correcting the erection signal obtained from the pick-off device associated with the bank pendulum.

It is a further object of the invention to generally improve the construction of and provide more accurate and reliable operating results in vertical gyroscopes.

The above and other objects of the invention will become apparent upon reading the following detailed description in conjunction with the accompanying drawings, in which:

Fig. 2 is a wiring diagram of the bank gimbal erection system.

Fig. 3 is a cross sectional view of the pendulum assembly for the bank gimbal erection system.

Fig. 4 is a vector diagram with respect to two possible angular movements of the bank or roll pendulum.

Figure 1:
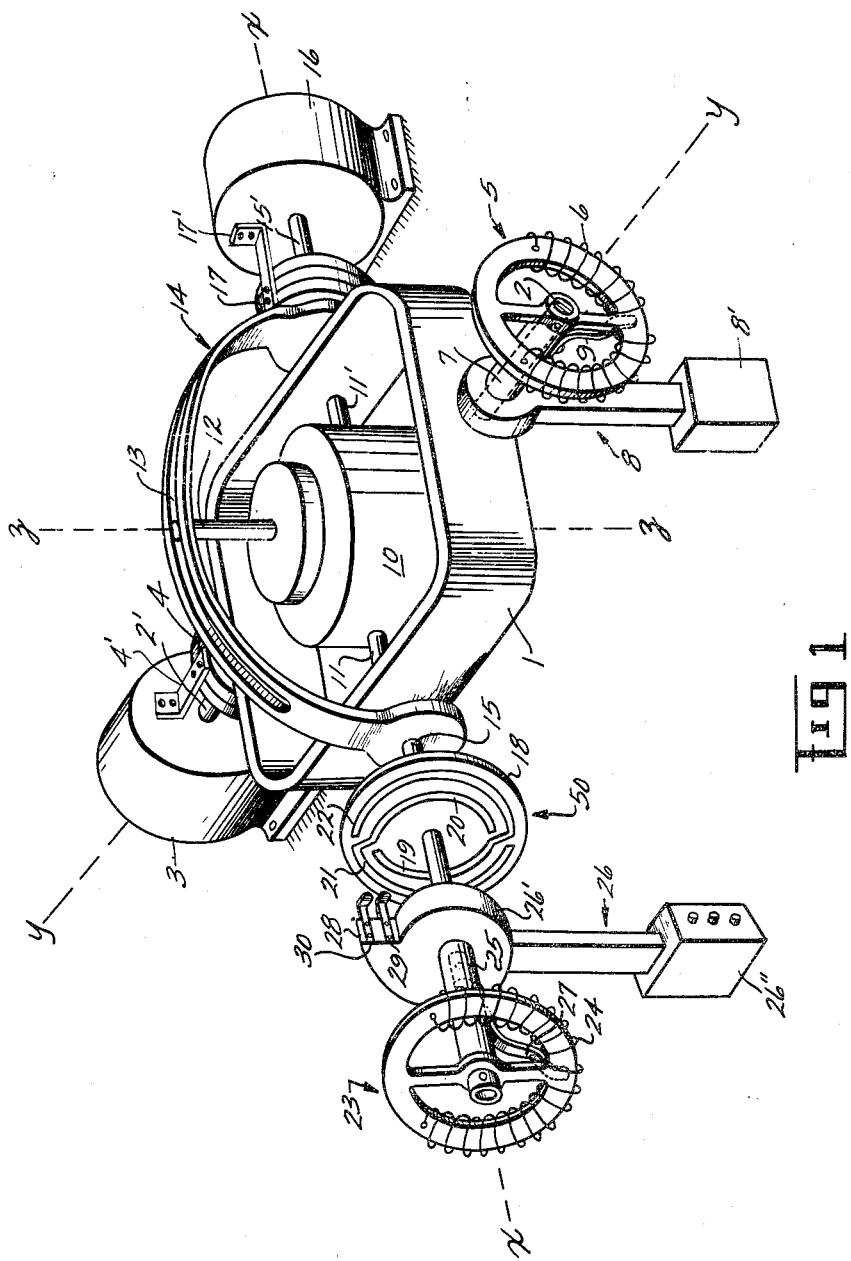
Fig. 1 is a schematic perspective view of a vertical gyroscope built according to the principles of the present invention.

In the drawings (Fig. 1) there is shown a vertical gyroscope, or gyro, which for the purpose of the description will be assumed to be mounted in an aircraft with the $x$—$x$ axis in a fore-and-aft or longitudinal direction, the $y$—$y$ axis extending transversely of the aircraft and the $z$—$z$ axis extending always in a vertical direction, or in the direction of gravity vertical. The gyro comprises a main gimbal ring 1 mounted to turn about a normally horizontal axis $y$—$y$ determined by the stub shafts 2 and 2' rigidly connected to the ring. The shaft 2 includes an extension (not shown) which is mounted for rotation in a fixed bearing, while the other shaft 2' is journaled by means of bearings which form part of an elevator signal pick-off synchro unit 3, also known as the pitch synchro. Connected to the shaft 2' within the unit 3 is a synchro rotor which is adapted to be rotatably displaced for producing a signal which may be fed to a position reproducing system such as a receiving synchro or servomotor system. The construction and operation of self-synchronous systems, commonly called synchro systems or Selsyn systems, are so well-known that a full description thereof is unnecessary in this specification.

Coaxially mounted on the shaft 2' is a torque motor or torquer 4 having a squirrel cage rotor fixed on the shaft and having a wound stator rigidly connected to the fixed casing of synchro unit 3 by means of an angle bracket 4'. The stator includes two-phase field windings adapted to exert a torque on the rotor in either direction of rotation depending on the phase relation of the current applied to the windings. The torque developed in the rotor exerts a precessing force to correct deviations of the bail ring to be described below. The field windings may be connected to a source of alternating current, to be more fully described below, by means of leads extending under the bracket 4'.

The stub shaft 2 has secured thereon by means of a hub and set screw a potentiometer 5 having a center tapped winding 6. Freely rotatable on the shaft 2 is a sleeve 7 which is rigidly connected to a pitch pendulum 8 and to a potentiometer wiper 9. Since the pendulum 8 having a weight 8' thereon will tend to seek the gravity vertical even though the aircraft is in a glide or climb attitude, the potentiometer will provide a signal of such polarity and magnitude as to correspond to the attitude and the amount of deviation of the aircraft from the horizontal or level flight position.

Rotatably mounted within the gimbal ring 1 is the gyro unit 10 which comprises a small induction motor capable of rotating at very high speed. The unit 10 includes a housing which completely encloses the motor and is pivotally mounted by means of two stub shafts 11 and 11' rigidly secured to the gimbal ring 1 as shown. On the upper end of the unit 10 there is fixed a stub shaft 12 having its free end movable in a slot 13 formed in the bank gimbal or bail ring 14. The opposite ends of the ring 14 carry the stub shafts 15 and 15' which form the $x$—$x$ or fore-and-aft axis of the gyroscope. An extension of the shaft 15 is journaled in a fixed bearing (not shown), while the shaft 15' is journaled in bearings forming part of an aileron signal pick-off synchro unit 16, also known as the bank synchro or roll synchro connected to the shaft 15' within the unit 16 is a synchro rotor which is adapted to be rotatably displaced for producing a signal which may be fed to a position reproducing system such as a receiving synchro or servomotor system.

Coaxially mounted on the shaft 15' is a torque motor or torquer 17 having a squirrel cage rotor fixed on the shaft and having a wound stator rigidly connected to the fixed casing of synchro unit 16 by means of an angle bracket 17'. The stator includes two-phase field windings adapted to exert a torque on the rotor in either direction of rotation depending on the phase relation of the current applied to the windings. The torque developed in the rotor exerts a precessing force to correct deviations of the gimbal ring 1. The field windings may be connected to a source of alternating current, to be more fully described below, by means of leads extending under the bracket 17'.

Fixedly mounted on the shaft 15 is a circular switch plate 18 of insulating material which carries cross-connected strips of metal 19, 20, 21 and 22 as shown, to provide a reversing switch 50 as will be described below. A potentiometer 23 having a hub drilled and tapped for a set screw is adapted to be secured on the shaft 15, although as seen in Fig. 1 all parts outwardly of the plate 18 are displaced longitudinally of the shaft 15 to aid in illustrating the switch plate. The potentiometer includes a center tapped winding 24. Freely rotatable on the shaft 15 is a sleeve 25 which is rigidly connected to a bank pendulum 26 and to a potentiometer wiper 27. At the upper end of the pendulum there is provided a hub-like enlargement 26' of insulating material. This enlargement is made cycloidal in plan to provide a flat shoulder 28 on which are mounted two spring-arm switch contactors 29 and 30. These contactors are so located as to contact the several circular strips on the switch plate 18 when the pendulum and sleeve assembly is moved into closely adjacent relation with respect to the switch plate 18.

The pendulum weight 26'' of pendulum 26 is made in the form of a housing having three flexible leads P—1, P—2, and P—3 extending therefrom. The details of interior construction of the pendulum weight are shown in Fig. 3, wherein it will will be seen that there is a case 32 open at the bottom to receive a weighted bottom plate 33 secured in any convenient manner so as to close the case and also provide sufficient mass at the greatest possible radial distance from the center of rotation ($x$—$x$ axis). Mounted within the case 32 are two units, an accelerometer unit 34 and a potentiometer unit 35. The unit 34 comprises a guide cage 36 which may be of circular cross-sectional shape with a longitudinal slot 37 in the wall as shown. The interior of the cylindrical cage is preferably provided with several anti-friction ribs 38. Slidably mounted in the cage 36 is a small weight 39 suspended from the top wall of the case 32 by means of a light coil spring 40. Attached to the weight 39 is a potentiometer wiper 41 which extends through the slot 37 and also has a flexible lead attached thereto which forms the accelerometer lead P—3. The potentiometer unit comprises a body 42 secured to one side wall of the case 32 by means of a clamping band 43. The body 42 may have an oval or elliptical cross sectional shape decreasing in area toward the lower end of the body. This decrease is not a linear function, since the acceleration force on the pendulum is dependent on the cosine of the angle of swing. However the curve forming the rear side of body 42 must be less pronounced than a cosine curve because of the cross sectional shape of the body. Thus if the body 42 were of rectangular cross section the curved shape on the rear side thereof would follow more nearly a cosine curve. The actual shape of this curve will depend also on the range of bank angle for which compensation is desired, since a relatively narrow range will require a shape corresponding to only a partial cosine curve. Further explanation of the accelerometer and accelerometer potentiometer will be stated hereinbelow.

Considering now the wiring diagram of Fig. 2 it will be noted that the accelerometer potentiometer 35 is indicated diagrammatically. The reversing switch 50 comprising the disk 18 and curved metallic strips 19 to 22 is adapted to connect the battery 51 across the potentiometer winding with the polarity of the terminals being reversed by relative movement of the disk 18 and the pendulum 26 sufficient to carry the brushes 29 and 30 across the radial dividing line of the strips 19 to 22. In practice the brushes have curved ends presenting only line contact with the curved strips and the actual separation between adjacent ends of the curved strips is very small, usually less than one thirty-second of an inch. The bank potentiometer 23 has its winding and wiper rotatable with the shaft 15 and bank pendulum 26 respectively, so that the wiper 27 swings to one side or the other of the center point of the winding 24 at the same time the reversing switch 50 is actuated to reverse the polarity of the potential applied to the potentiometer 35. This interdependent action is indicated in Fig. 2 by the curved line S, but the actual structure is shown clearly in Fig. 1. The polarity of the batteries 51 and 52 is such that the signal from the potentiometer 35 always opposes the signal from the potentiometer 23. The resultant signal is fed to the input resistor 53 of the electronic control circuit E. The opposition offered by the signal from the accelerometer potentiometer 35 prevents the bank potentiometer 23 from producing an exaggerated signal due to displacement of the bank pendulum 26 under the influence of centrifugal forces set up by turning. It is understood of course that the aircraft normally is banked during a turn, and especially in a sharp turn. As the speed of aircraft increases this tendency of the bank pendulum to swing out of the vertical position during a turn increases very noticeably. Thus if the bank potentiometer alone were depended on to produce an erecting signal for the vertical gyro, the spin axis of the gyro would soon be displaced from the gravity vertical through the action of the torquer 4 even though the bank and turn maneuver is completed in a short period of time.

The input resistor 53 of the control circuit E is center tapped and connected to the center tap is a battery 54 also connected to the cathode circuit of dual triode 55. This vacuum tube may be of a type designated 12SN7 or any other similar type. The grids which are biased by the potential source 54 are connected to opposite ends of the input resistor 53. In operation the signal from the potentiometer circuit will make one grid more negative than the other so that the one which is least negative will cause that half of tube 55 to conduct current from the 400 cycle 115 volt source to the corresponding magnet of the balanced polarized relay 56. When one magnet of the relay 56 is energized the relay armature is closed against one of the two relay contacts to connect the 400 cycle 115 volt source to one or the other field winding of the torque motor 4. These windings are poled in such a manner that the motor 4 is operated in opposite directions of rotation depending on which winding is connected through the relay 56 to the 400 cycle 115 volt source. The two motor windings are designated 4' and 4", and the corresponding relay magnets are designated 56' and 56". The condensers 57 and 58 connected across the windings of relay 56 are for the purpose of preventing chattering of the relay armature by absorbing the alternating current component of the signal reaching the relay windings. The relay armature, which is designated 59, is preferably retained in the neutral position as shown by means of a very light leaf spring, so that the armature will not complete a circuit to either of the motor windings as long as there is no signal being fed to the control circuit E by the potentiometer circuit comprising potentiometers 23 and 35. It is to be understood that the torque motor 4, being mounted on the gyroscope assembly with its axis of rotation at a right angle to the axis of rotation of the bail ring 14, will be effective to precess the ring in one direction of rotation or the other depending on the direction of rotation of the rotor of the torque motor 4. These relative directions of rotation as well as the theory of precession are explained in Chapter I of "The Theory of the Gyroscopic Compass" by A. L. Rawlings (2nd Edition—1944). This correcting precession continues until the bail ring 14 is in the vertical plane and no further signal is originated by the potentiometer circuit.

In a manner similar to the operation of the torquer 4, the other torquer 17 is adapted to be energized through the operation of the pitch potentiometer 5 and pitch pendulum 8. In the complete gyroscope the potentiometer 5 is also provided with a source of direct current similar to the battery 52 of Fig. 2 and thus produces signals which are connected to another electronic control circuit, similar to circuit E, so as to effect operation of the torquer 17. This torquer, whose axis is at a right angle to the axis of rotation of the gimbal ring 1, causes a precessing movement of the ring 1 to correct deviations thereof from the relatively horizontal position shown in Fig. 1. Since the pitch pendulum is not subject to appreciable centrifugal force during turns, the single potentiometer 5 and direct current source is all that is required to control the separate electronic control circuit which in turn controls operation of the torquer 17.

For further consideration of the operation of the potentiometers 23 and 35 (Fig. 2) reference is made to Fig. 4. In this view the bank pendulum 26 is represented in its normal vertical position by the line XP, and for the purpose of illustration is assumed to take two angular positions represented by lines $XP_1$ and $XP_2$. These positions would correspond to conditions in two different bank and turn maneuvers and are shown on the same side of the normal vertical for convenience and comparison. With the center of pendulum swing X corresponding to the axis $x$—$x$ of Fig. 1, the pendulum will swing out through angle $\theta_1$ for a certain turn of large radius and small bank angle. In so moving the pendulum, whose mass may be considered as concentrated at point P, will be acted on by acceleration forces and the resultant of these forces will always extend in the direction of the pendulum itself. This resultant is indicated by the vector Ar, which is made up of components of the gravitational vector Ag and the centrifugal vector Ac. Similarly for an angle of pendulum displacement $\theta_2$ the resultant of the gravitational and centrifugal vectors Bg and Bc is the vector Br. However in each case the gravitational vector remains the same length because the force of gravity is constant. Furthermore since the component vectors always extend in the same direction, the resultant vector may be represented by a straight line extending from the center of pendulum swing X to the horizontal line $h$—$h$ extending through the point P for any angle of displacement that may be chosen. The resultant vector represents the acceleration force available to cause downward displacement of the accelerometer weight 39 (Fig. 3). However the weight is normally displaced even when the pendulum is at rest by an amount corresponding to the gravitational acceleration force, so that any additional displacement from the relative position as shown in Fig. 3 is caused by centrifugal acceleration force. It is this additional displacement which is adapted to determine the strength of the signal from the potentiometer 35. Since the turn error erection signal applied to the control circuit E is proportional to the angular displacement of the bank pendulum from gravity vertical with the simultaneous actuation of the potentiometer 23, it follows that a signal which will be effective to cancel out this turn error must have equal potential differences for each degree of pendulum swing away from the true gravity vertical. However since the accelerometer weight 39 is influenced only by the acceleration forces as explained above, and by the spring 40 of constant modulus of elasticity, the winding on the potentiometer 35 must be made in such manner as to compensate for the larger values of the resultant acceleration force at the larger angles of bank encountered in sharp turns. Since the gravitational vector, such as $Ag$ or $Bg$, is constant the cosine of the angle of pendulum swing provides the key to proper contour of the winding form or body 42 of the potentiometer 35. For instance at angle $\theta_1$ (about 10 degrees) the cosine is $Ag/Ar$, while for angle $\theta_2$ (about 40 degrees) the cosine is $Bg/Br$. The relative values of these quantities are obvious from an inspection of Fig. 4. The reason that the larger end of the potentiometer body 42 is located at the upper end of the assembly (Fig. 3) is that for low bank angles and wide turns the displacement of weight 39 will be slight, and therefore it will require more resistance wire per turn on the body to produce a corrective signal directly proportional to the displacement of the bank pendulum from gravity vertical during the turns.

From the foregoing description of the construction and theory of operation of the turn compensated gyro-vertical it will be appreciated that the present gyroscope is compensated for turn error induced by accelerations developed during turns. Since gyroscopes are customarily provided with simple pendulum devices actuating an erecting means such as a torque motor, it has been found expedient in most known gyroscopes to merely cut off the erection system during turns to prevent an incorrect erection which results from acceleration forces on the bank pendulum. These forces would cause the pendulum to swing beyond the gravity vertical and so give a false signal to the erection system. Thus it can be seen that in a procedural turn at high speed, a pendulum is not a very satisfactory reference device unless turn compensation is provided. Furthermore if the erection system is cut off during a turn the gyroscope must then maintain itself in a reference position without correction by the pendulous reference means. However since all gyroscopes are subject to frictional forces or "couples" inherent in the suspension, the resulting precession will cause the gyroscope to leave its correct reference position while the erection system is cut off.

By the use of the present invention it is possible to keep the erection system for a vertical gyroscope in operation at all times. This is made possible by the acceleration responsive potentiometer 35 capable of producing a signal proportional to the angle between the bank pendulum and true gravity vertical. In other words a potentiometer device is provided which responds to the magnitude of the acceleration in the direction of the resultant acceleration force to produce a signal which is actually a measure of the angle between the pendulum and the gravity vertical. Since the signal developed by the pendulum actuated potentiometer 23 is by the same token too great during a normal procedural turn to give a correct erection signal, it is necessary to oppose this primary signal by the secondary signal developed by the acceleration potentiometer 35.

This opposition is brought about by connecting the batteries 51 and 52 in such a manner that they will always oppose each other in the potentiometer circuit. The connections are of course determined by the arrangement of the reversing switch 50 and the potentiometer 23 of Fig. 1. The switch contactors 29 and 30 correspond to the movable blades of switch 50 as shown in Fig. 2, while the curved metallic strips 19 to 22 correspond to the contact points of the switch as shown in Fig. 2.

The present gyro-vertical is adapted for general application, especially in that it is just as well adapted for operating an indicating instrument to show apparent deviation of an aircraft from the normal level flight attitude as it is for applying signals to a servomotor system for controlling the aircraft flight. The latter class of service is more commonly referred to as an automatic pilot or a gyrostabilizer. More particularly the bank synchro 16 may be used to reproduce by means of a receiving synchro unit the bank condition of the aircraft on an instrument dial and at the same time the bank synchro 16 may be used to put a signal into the aileron signal system of the auto-pilot to operate the ailerons by a servomotor and thus correct the deviation of the aircraft. In the same way the pitch synchro 3 is adapted for these two purposes, that of indication of apparent pitch attitude of the aircraft, as well as correction of the deviation by operation of the aircraft elevator servomotor system.

It is noted that in Fig. 1 there are no electrical leads shown for the various switches, potentiometers, torquers and Selsyns but it is understood that flexible leads and brushes of various types will be used in a manner customary in the gyroscopic art. Their presence on Fig. 1 would confuse the drawing and add nothing which is not already known to those skilled in the art. The values of electrical potentials employed may be changed or varied according to conditions of use or power sources available. While the potentiometer type of signal generating means has been used for the purpose of illustration it should be understood that other equivalent devices may be substituted if desired. For instance variable inductors or variable condensers may be used with proper application of potential sources thereto. Also for convenience in illustration and compactness the bank and pitch pendulums 26 and 8 are mounted on the shafts 15 and 2 respectively, but it should be understood that these pendulum reference devices may be located remotely from the gyroscope itself but properly orientated to give the desired two axis control or indication. In this type of installation the deviations of the gyroscope about its two axes $x$—$x$ and $y$—$y$ must be transmitted to the pendulum devices by synchro systems in a well-known manner. This alternative arrangement merely involves remote or indirect sensing by the pendulum devices of gyroscopic deviations, along with the same control of the gyroscope by the pendulum devices as described and illustrated.

The embodiments of the invention herein shown and described are to be regarded as illustrative only and it is to be understood that the invention is susceptible to variations, modifications and changes within the scope of the appended claims.

I claim:

1. In a universally mounted vertical gyroscope for aircraft, a main gimbal ring mounted to turn about a lateral axis of said aircraft, a gyro unit including a rotor adapted to spin at high speed about a normally vertical axis, pivot means secured to opposite sides of said ring interiorly thereof and serving to pivotally mount said gyro unit on a normally horizontal axis lying at a right angle to said lateral axis, a bank gimbal bail ring mounted to turn about a fore and aft axis of said aircraft, means to maintain said spin axis of said gyro unit in the plane of said bank gimbal bail ring, individual means carried on said main gimbal ring and said bank gimbal bail ring for applying precessing torques to the gyroscope about said lateral and fore and aft axes respectively, individual pendulum actuated means for controlling the respective torque applying means and responsive to deviations of said gyro unit about said normally horizontal axis and said lateral axis respectively, and means responsive to the resultant acceleration in a banked turn of said aircraft to cancel turn error resulting from centrifugal force acting on the control pendulum of the pendulum actuated means for controlling the precessing torque about said lateral axis.

2. In a universally mounted vertical gyroscope for aircraft, a main gimbal ring mounted to turn about a lateral axis of said aircraft, a gyro unit including a rotor adapted to spin at high speed about a normally vertical axis, pivot means secured to opposite sides of said ring interiorly thereof and serving to pivotally mount said gyro unit on a normally horizontal axis lying at a right angle to said lateral axis, a bank gimbal bail ring mounted to turn about a fore and aft axis of said aircraft, means to maintain said spin axis of said gyro unit in the plane of said bank gimbal bail ring, individual means carried on said main gimbal ring and said bank gimbal bail ring for applying precessing torques to the gyroscope about said lateral and fore and aft axes respectively, individual pendulum actuated means for controlling the respective torque applying means and responsive to deviations of said gyro unit about said normally horizontal axis and said lateral axis respectively, an accelerometer mounted on the control pendulum of the pendulum actuated means for controlling the precessing torque about said lateral axis, an acceleration responsive mass forming an element of said accelerometer and adapted to actuate an electrical control device to produce an electrical signal proportional to the angle between said pendulum and gravity vertical, and means whereby said signal provides correction for the precessing torque applied to said gyroscope about said lateral axis during a banked turn of said aircraft.

3. A vertical gyroscope compensated for turn error comprising, a gyro unit having its spin axis normally in the direction of gravity vertical, a universal suspension for said gyro unit including pivot means providing a transverse suspension axis and a longitudinal suspension axis, a first torque motor on said suspension coaxial with respect to said transverse axis, a second torque motor on said suspension coaxial with respect to said longitudinal axis, individual pendulum actuated means for controlling the respective torque motors and responsive to deviations of the spin axis of said gyro unit from gravity vertical to apply power to said torque motors for precessing said gyro unit back to the normally vertical attitude, an accelerometer carried by the pendulum of the pendulum actuated means for said first torque motor, signal means actuated by said accelerometer to produce an electrical signal proportional to the angle between said pendulum and gravity vertical during a turn of sufficient scope to actuate said accelerometer, and an electrical circuit whereby said signal is fed to the pendulum actuated means for said first torque motor to cancel turn error resulting from acceleration forces on said pendulum during said turn.

4. A vertical gyroscope as recited in claim 3, wherein said signal means comprises a potentiometer having resistance characteristics corresponding to the cosine function from an angle of zero to an angle less than ninety degrees.

5. A vertical gyroscope as recited in claim 3, wherein said accelerometer comprises a weight suspended by a spring and constrained to move in the direction of the length of said pendulum, and wherein said signal means comprises a wire wound potentiometer including a winding form having a profile corresponding to a portion of a cosine curve.

6. A vertical gyroscope compensated for turn error comprising, a universally mounted gyroscope having its spin axis normally extending in the direction of gravity vertical, a first torque-applying control means to erect the said spin axis about a transversely extending axis, means including a first pendulum to energize said first control means, a second torque-applying control means to erect the said spin axis about a longitudinal axis, means including a second pendulum to energize said second control means, acceleration responsive means carried by said second pendulum and adapted to produce an electrical signal proportional to the angle between said second pendulum and gravity vertical, and an electrical circuit whereby said signal is fed to said second control means to correct the position of the spin axis during turns.

JOHN SAMUEL ADKINS.

REFERENCES CITED

The following references are of record in the file of this patent:

UNITED STATES PATENTS

| Number | Name | Date |
|---|---|---|
| 2,041,526 | Carter | May 19, 1936 |
| 2,429,612 | Curry | Oct. 28, 1947 |